US011507361B2

(12) United States Patent
Fumagalli et al.

(10) Patent No.: US 11,507,361 B2
(45) Date of Patent: Nov. 22, 2022

(54) SYSTEM TO DESIGN AND/OR UPDATE PROGRAMS FOR INDUSTRIAL DEVICES ASSIGNED TO THE OPERATOR INTERFACE AND/OR TO MANAGE MACHINES AND/OR PLANTS FOR INDUSTRIAL AUTOMATION

(71) Applicant: ASEM s.r.l., Casale sul Sile (IT)

(72) Inventors: Maurizio Fumagalli, Meda (IT); Alberto Riccio, Verona (IT)

(73) Assignee: ASEM S.R.L., Artegna (IT)

( * ) Notice: Subject to any disclaimer, the term of this patent is extended or adjusted under 35 U.S.C. 154(b) by 0 days.

(21) Appl. No.: 17/056,997

(22) PCT Filed: May 21, 2019

(86) PCT No.: PCT/IT2019/050109
§ 371 (c)(1),
(2) Date: Nov. 19, 2020

(87) PCT Pub. No.: WO2019/224854
PCT Pub. Date: Nov. 28, 2019

(65) Prior Publication Data
US 2021/0157565 A1    May 27, 2021

(30) Foreign Application Priority Data

May 21, 2018   (IT) .................... IT102018000005542

(51) Int. Cl.
*G06F 8/65*       (2018.01)
*G05B 19/05*      (2006.01)
*G06F 8/20*       (2018.01)

(52) U.S. Cl.
CPC ............. *G06F 8/65* (2013.01); *G05B 19/056* (2013.01); *G06F 8/20* (2013.01); *G05B 2219/13144* (2013.01)

(58) Field of Classification Search
CPC .......... G06F 8/65; G06F 8/20; G05B 19/056; G05B 2219/13144
See application file for complete search history.

(56) References Cited

U.S. PATENT DOCUMENTS

| 2005/0066320 A1* | 3/2005 | Petig ................. G05B 19/0426 717/146 |
| 2007/0067341 A1* | 3/2007 | Chen ........................ G06F 8/38 |

(Continued)

OTHER PUBLICATIONS

International Search Report; PCT/IT2019/050109 dated Jan. 8, 2019; 2 pages.

*Primary Examiner* — Daxin Wu
(74) *Attorney, Agent, or Firm* — Fletcher Yoder, P.C.

(57) ABSTRACT

System to design and/or update programs for the operator interface of machines and/or plants that comprises at least one first calculation device dedicated to the management of a machine and/or plant, which contains at least one application program to manage the human-machine interface (HMI) of the machine and/or plant, and a second calculation device to execute a software, or development environment, to create a project file, wherein on the first calculation device and on the second calculation device respective communication programs are installed, suitable to transfer the project to the first calculation device, where the application program for the management of the HMI interface displays the project by means of a suitable OPC UA standard information model, by means of which it is possible to make modifications to the project dynamically, without interrupting the execution of the human-machine interface program, and so that every modification to the project, and therefore to the human-machine interface program, is immediately displayed and used by the human-machine interface.

15 Claims, 1 Drawing Sheet

(56) References Cited

U.S. PATENT DOCUMENTS

| | | | |
|---|---|---|---|
| 2007/0132779 A1* | 6/2007 | Gilbert | G05B 19/41885 345/619 |
| 2007/0149036 A1* | 6/2007 | Misovski | G06F 8/38 439/419 |
| 2010/0325571 A1* | 12/2010 | Kodosky | G06F 8/34 715/772 |
| 2014/0040431 A1* | 2/2014 | Rao | G06F 16/2282 709/219 |
| 2014/0040798 A1* | 2/2014 | Kodosky | G06F 3/0481 715/765 |
| 2015/0169318 A1* | 6/2015 | Nash | G06F 8/656 717/168 |
| 2015/0199181 A1* | 7/2015 | Gimnich | G06F 8/20 717/104 |
| 2016/0357527 A1* | 12/2016 | Geva | G06F 8/34 |
| 2017/0060726 A1 | 3/2017 | Glistvain | |
| 2019/0266330 A1* | 8/2019 | Thaler, III | G06F 21/53 |

\* cited by examiner

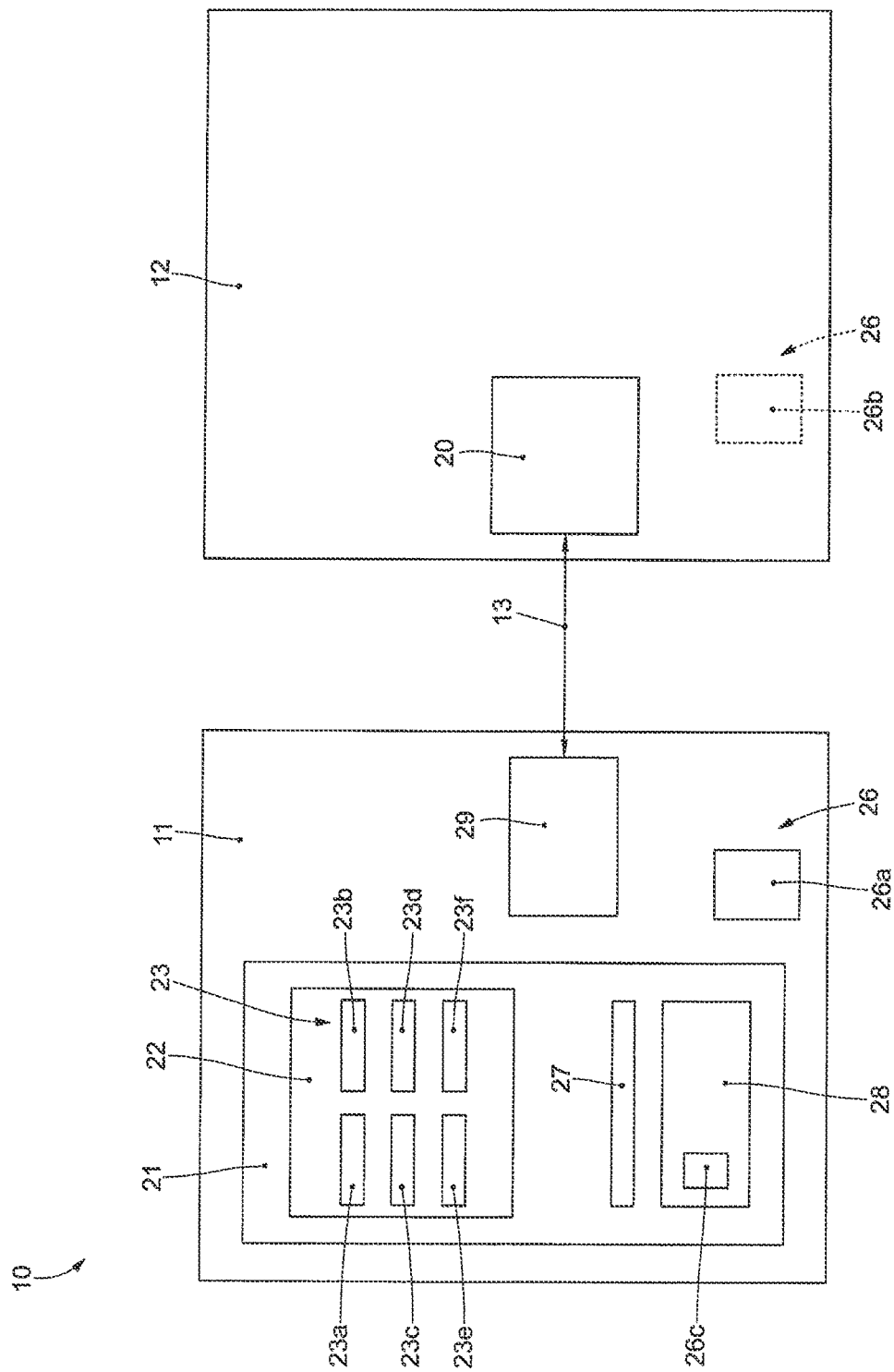

SYSTEM TO DESIGN AND/OR UPDATE PROGRAMS FOR INDUSTRIAL DEVICES ASSIGNED TO THE OPERATOR INTERFACE AND/OR TO MANAGE MACHINES AND/OR PLANTS FOR INDUSTRIAL AUTOMATION

CROSS-REFERENCE TO RELATED APPLICATION

This application claims benefit of and is a National Stage entry from PCT Application No. PCT/IT2019/050109, filed on May 21, 2019; which claims priority to and benefit of Italian Application No. IT102018000005542, filed on May 21, 2018, both of which are entitled "System to Design and/or Update Programs for Industrial Devices Assigned to the Operator Interface and/or to Manage Machines and/or Plants for Industrial Automation", both of which are herein incorporated by reference in their entirety.

FIELD OF THE INVENTION

The present invention concerns a system to design and/or develop programs for industrial devices assigned to the human-machine interface (HMI) and/or assigned to control machinery and/or plants for industrial automation.

The invention also concerns a method to update the programs executed on the industrial devices.

In particular, the invention concerns a system and a connected method both to manage the modifications and also the updates to the programs that allow an operator to interact with the machines and/or with the automation plants.

More generally, the present invention is applied in developing and updating all application programs of systems that require and/or allow human-machine interactions in the industrial and other fields. Hereafter, for ease of description, we will refer to these as human-machine interfaces (HMI).

BACKGROUND OF THE INVENTION

In the field of industrial automation, but also in other fields of the art, it is known to use hardware systems complete with application programs that allow an operator to interact and/or interface with a plant and/or machine, through a display, a keyboard, a mouse and/or touchscreen.

When manufacturers and/or the system integrators design any automation machinery and/or plant they tend to develop an application program that can satisfy customer requirements as much as possible. This means that eventually it is necessary to meet needs that involve different functionalities and/or configurations of the machine and/or plant.

No matter how exhaustive the initial analysis, it is during the installation and testing step that both further requests and also possible additional needs emerge.

These additional needs require intervention with a further customization of the application programs originally developed. Subsequent requests, or new identifications, create difficulties for the machine manufacturers and/or system integrators, as often the people assigned to installation and testing activities do not have the skills and knowledge of the application designers.

To design modifications and/or new functionalities the current state of the art provides to use a special software, called integrated development environment (IDE).

The software is known for the development of a so-called project file that defines the functionalities of the HMI application program and is normally installed on a different computer from the HMI device of the machine and/or plant assigned to execute the application program.

The new project file is uploaded, with the corresponding modalities, on the HMI device of the machine or plant, according to the modalities required by the hardware unit.

A program called "runtime" is normally installed in the hardware unit, which executes the project file itself. The computers on which the IDE is installed, which are used to develop the application project, are normally different from the computers installed on the machines and/or plants, such as HMI/control units.

Computers used to develop projects are normally office PCs with high processing capacity performance. On the other hand, the characteristics of the computers dedicated to the HMI and control unit are defined specifically for each different type of machine and/or plant, paying great attention to the price/performance ratio. It should be remembered that these dedicated computers have to be able to withstand the industrial environment in relation to temperature, humidity, vibrations and resistance to disturbances.

In any case, it is always possible, in relation to the complexity of the HMI application and the resources available, to install in the HMI/control unit both the IDE and also the runtime, which contains a set of functional modules assigned to executing each of the functionalities of the HMI application.

The need to update the control unit with modifications to existing functionalities or with additions of new functionalities to the application program often causes continuous downtimes. The downtimes can delay even considerably the final testing of the machine and/or interrupt production even for economically unacceptable times. These delays, consequently, cause losses of production days that can result in both payment delays and also canceled orders. These are just some of the disadvantages of the state of the art that are evident and occur above all when the users of the machines and/or plants ask for customizations in the installation and testing step.

US 2017/0060726 describes a solution of the state of the art to provide a web-based programming environment to facilitate programming, uploading and debugging in an industrial automation controller.

There is therefore the need to provide a new method to update one or more programs to be executed in a control unit of a machine and/or plant.

In particular, one purpose of the present invention is to define a method to update the application program, uploaded and executed on the HMI/control unit of the machine and/or plant, which allows to make modifications or to add or integrate new functionalities directly from the unit itself. All without needing to have the IDE available, and without needing to stop the machines and/or plants.

Another purpose is to provide a method which allows to execute a temporary update of the application program, so that the modifications or additions are valid only for a period, that is, their termination is linked to a specific event.

Temporary updating, for example, is very useful in cases where there is a desire to test the modifications and/or the new functionalities before deciding whether to definitively consolidate the modification.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to the invention, a system to design and/or update programs for operator interfaces of machines and/or plants comprises at least one first calculation device dedicated to the management of a machine and/or plant, which contains at least a software to manage the human-machine interface (HMI) of the machine and/or plant, and a second calculation device to execute a software, or development environment, to create a project file, which contains the functional description of the HMI program. Respective communication programs are installed on the first calculation device and on the second calculation device.

The second calculation device comprises means to describe the characteristics of the project file, which, after being transferred to the calculation device and executed on the calculation device, displays an information model, consisting of a series of nodes and relations between nodes, descriptive of the HMI project.

By means of interfaces and standard instructions between software, the HMI project can be modified interacting with the information model while the HMI program is being executed on the calculation device.

Furthermore, in accordance with the above purposes, a system to design and/or update programs of the HMI/control unit of a machine and/or plant, or also of an automation system, according to a first formulation can provide a second computer in which the IDE is installed.

According to the invention, with the IDE it is possible to make modifications or additional integrations and send them via a known mode to the destination unit. Known modes can be, for example, a local or remote Ethernet network, or a USB key, or other known or usable system.

If the characteristics of the destination unit allow it, it is also possible to upload the IDE directly on the HMI/control unit.

As indicated, the program called Runtime is installed in the HMI/control unit of the machine and/or plant, that is, also in the automation system.

The program is a set of functional modules, among which, by way of a non-limiting example: the graphic interface module; the alarm management module; the recipe management module; and the module to manage communications toward the fieldbus, etc.

One or more of these modules executes the application program developed with the IDE, consequently interacting with the assigned components of the machines and/or plant.

According to a variant, the communication module of the known type, which operates toward the fieldbus, also comprises the OPC UA protocol which provides a secure and encryptable communication with certificates.

According to a further variant, the runtime program comprises the OPC UA client functionality, which allows to communicate with the affected components of the machines and/or plant through the communication protocol defined by the OPC UA standard, or other comparable.

According to a variant of the invention, the runtime program also comprises the OPC UA server functionality which allows to display the values relating to the variables under control to other affected components, which implement the OPC UA client standard.

The invention, through a structured extension of the OPC UA standard information model, allows to display all the functionalities that characterize the HMI project in its entirety by means of standardized indications, such as Object Type, Object, Variable Type, Variable, Method, Reference Type, Reference, as described by the OPC UA standard.

As a result, the runtime is able not only to analyze and interpret the project data that define the HMI application, but also to generate additional information.

According to a further variant, the additional information can describe all the properties of each individual functionality of the HMI project.

It is a variant of the invention that one or more of said properties are displayed by the OPC UA server integrated in the runtime, extending the OPC UA standard information model with further OPC UA nodes, maintaining total compatibility with the current situation.

It should be understood that the concepts of the present invention are not limited to the use of the OPC UA standard, although reference will be made to this in the following description and claims. In fact, other standards with comparable or equivalent characteristics can also be used.

According to one embodiment of the invention, the functional characteristics of the project are described through the OPC UA nodes.

The nodes allow to exchange information, in terms of both values and also semantics, between devices enabled for communication by means of the OPC UA standard.

Two software that use the OPC UA standard can therefore exchange information between them, both if they are being executed on the same computer, and also if they are located on two remote computers connected to each other in a known manner.

Embodiments of the present invention use and extend the OPC UA standard in order to create a series of "Object Types", provided with a series of Instance Declarations, and more generally OPC UA nodes, which describe their characteristics. The OPC UA nodes define all the objects of an HMI project. It is therefore possible to develop the information model of the project file so that it is compatible with the OPC UA standard.

The Instance Declarations can in turn be extended to add possible further characteristics to the Object Types. In other words, the characteristics of an HMI project can be modified by acting on the Object Types and on the Instance Declarations, and more generally on the OPC UA nodes that describe them.

According to one aspect of the invention, by means of these new Object Types it is possible to modify and/or update the HMI project/application directly on the Runtime installed on the HMI/control unit of the machine and/or plant. The modification, according to the invention, maintains full compatibility with the OPC UA standard.

According to a further aspect of the invention, the modifications and/or updates do not require the use of the IDE.

In particular, by means of standard mechanisms of this communication specification, the invention allows to act on the OPC UA nodes, for example creating them, eliminating them or changing their attributes and properties. In this way, the characteristics of the project can be modified by acting on the information model of the HMI project displayed by the runtime OPC UA server.

According to some embodiments of the present invention, the runtime is able to detect if modifications have been made to the HMI project through the OPC UA nodes and implement them immediately. Consequently, there is the opportunity to update the functionalities of the application executed by the control unit without it being necessary to restart the runtime.

An example of a possible modification of the HMI project is obtained by acting on the OPC UA nodes that describe the information to be exchanged with the machinery controller (usually a PLC).

According to a further variant, the present invention is not limited to the possibility of modifying the OPC UA nodes that contain the values of the descriptive variables of the machine and/or plant exchanged with the machine and/or plant controller, but it allows the possibility of modifying any other element that is part of the user interface project, such as for example alarms, recipes, graphic objects on the screens and suchlike.

A possible example of modification of the variables exchanged with the machine and/or plant controller is provided below.

The variable usually has the following characteristics, among many others:
- Device to control the machine (for example PLC) in which the value to be associated with the variable is present.
- The type of datum that this variable can take: it is normally an integer or a string, but other known types of data are also used.
- Memory address of the control device (PLC) where the value to be assigned to the variable is found.

According to the present invention, while the project is being executed by the runtime, it is possible to modify the project by creating OPC UA nodes which describe variables exchanged with the machine and/or plant controller that were not provided during the design step, for example in relation to the modification of the functionalities of a PLC.

The invention allows to modify the characteristics of the nodes associated with the variables exchanged with the PLC so that the user interface adjusts and adapts to the modification.

In this way, the update of the program being executed on the machine and/or plant can occur even without interrupting the functioning of the machine and/or plant itself.

The exemplification indicated above relates to the communication nodes toward the machinery controller (PLC), but according to the invention, it can be extended to any element of the HMI project, such as for example a graphic element of the UI (User Interface), or an alarm, or any other characteristic both functional and also visual of the HMI project.

BRIEF DESCRIPTION OF THE DRAWINGS

These and other characteristics of the present invention will become apparent from the following description of some embodiments, given as a non-restrictive example with reference to the attached drawings wherein:

FIG. 1 schematically shows an embodiment of a system to design and/or update programs for the operator interface of machines and/or plants according to the present invention.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

The detailed description is given by way of example only and does not exhaust possible implementations of the invention. Embodiments of the present invention concern a system to design and/or update programs for the operator interface of machines and/or plants, and is indicated as a whole by the reference number 10.

The design system 10 comprises at least one first calculation device 11 applied, for example integrated or embedded, on the machine and/or plant, and a second calculation device 12 on which the specific software (or development environment 20) is executed.

The development environment 20 allows a user to define a project file 26 of the operator interface of a machine and/or plant.

In particular, in the project file 26 all the functionalities that the user interface of the machine and/or plant needs to have are described.

These functionalities can refer, for example, to the functionalities of the control devices with the corresponding variables and control parameters, as well as to all aspects connected to the graphic interface with the user.

It should be noted that the second calculation device 12 is represented here as a component separate from the first calculation device 11.

However, the considerations set forth below also apply if there is a single device suitable to execute both functions.

In particular, the two devices 11 and 12 are kept separate in the event that the first calculation device 11 does not have sufficient hardware resources to execute the development environment 20.

The first device 11 is used to execute a management program, called runtime program 21, of the interface between the user and the machine and/or plant, the runtime program comprising a control unit 22 consisting of a plurality of modules 23.

Each module 23 interacts with one or more functionalities of the machine and/or plant, as will be better described below.

According to one embodiment of the invention, the project file 26 defines the functionalities of the various modules 23, with the modalities explained below.

In the preferred embodiment, the project file 26 is described as a series of OPC UA nodes and relations between OPC UA nodes. From project file 26, the runtime is able to develop an information model (26c) of the HMI project and display it by means of an OPC UA server 28.

In the drawing of the embodiment, with reference to number 26a the project file 26 shared, or transmitted, through a communication channel 13 is identified. The communication channel 13 connects the two calculation devices 11, 12 in a known manner.

With reference to number 26b a project file 26 is indicated, created in the second calculation device 12 and transferred by known means, for example by means of a USB key, to the first calculation device 11.

According to a further aspect of the present invention, after transferring the project file 26, and after the OPC UA server 28 has displayed the project through the OPC UA information model 26c, it is possible to modify the information relating to the HMI project by means of instruction packets, for example Ethernet telegrams, defined by the OPC UA standard. In particular, by means of said instructions it is possible to modify the characteristics of the OPC UA nodes and the relations between said nodes, modifying the information model 26c of the HMI project and therefore the project itself.

According to some embodiments of the invention, to correctly display the information model 26c, the runtime program 21 uses a program called OPC UA server 28.

In particular, the invention provides that it is possible to describe, and therefore modify and/or update, the project file 26 no longer by means of a file, but acting on a series of nodes and relations between OPC UA nodes displayed by the OPC UA server 28 of the management program 21.

Although the present invention describes the use of the specific OPC UA standard to exchange information between enabled devices, it is within the scope of the invention to use also other specifications, standard or non-standard, provided they are compatible with the functions to be performed and provided they can be managed with the calculation devices 11 and 12 used.

According to one embodiment of the invention, upon activation of the first calculation device 11 a specific software is automatically launched, called update program 29.

The update program 29 interrogates, or is interrogated by, the development environment 20 of the second calculation device 12.

When the presence of an update project file 26 is communicated to the update program 29, the management program 21 activates its uploading and execution.

Then the runtime program 21 starts a program called loader 27.

The loader program 27 has the task of reading the definitions of the OPC UA nodes and the relations between the OPC UA nodes from the update file 26, as well as that of uploading into the OPC UA server 28 the information model 26c suitable to describe all the OPC UA nodes and the relations between the nodes of the specific project file 26. This functionality is a consequence of the fact that, according to the invention, the OPC UA standard, in particular the so-called information model of the standard, has been extended.

Said extension serves to describe the project file 26, using the OPC UA nodes and the relations between said nodes to display the project file 26 through the OPC UA server 28.

In particular, and more specifically, the extension of the OPC UA information model provides to create a series of OPC UA nodes of the type "Object Type", "Object", "Variable Type", "Variable", "Method", "Reference Type", "Reference", which allow to define all the elements of an HMI project.

Acting on the OPC UA nodes, possibly executable, made in the finalized manner, number and type, it is therefore possible to modify the project without any limitation, remaining compatible with the OPC UA standard.

When the loader 27 has finished its activity, the OPC UA server 28, through its information model 26c, is able to display the entire project 26 prepared in the development environment 20.

The various modules 23, which together constitute the control unit 22, are configured to read, each for the part for which they are responsible, a part of the project file 26 prepared in the development environment 20. To do so, each module reads the characteristics from the information model 26c uploaded by the loader 27 into the OPC UA server 28.

The modules 23 can comprise, for example, but not exclusively, alarm modules 23a, OPC UA client modules 23b, communication drivers toward control devices such as PLCs 23c, dataloggers or datastores 23d, recipes 23e, user management 23 f, and others.

Each of the modules 23 is suitably configured to know, and therefore acquire, the part of the project file 26 described by the information model 26c and displayed by the OPC UA server 28 that is relevant to them. In this way, after reading, each module 23 begins to execute, possibly updating, modifying and/or implementing its own functionalities, following the indications of the project file 26.

We will now supply some possible examples of modifications of the project file 26 uploaded in the information model 26c of the OPC UA server 28.

These examples involve:
Adding graphic elements to an interface panel, such as a label, a trend, etc.;
Moving a graphic object of a panel;
Modifying a translation of a text;
Changing address of a variable of the PLC.

Based on what has been described above, the modes with which the update occurs mean that any characteristic of the project file 26, acting on the information model 26c, can be modified.

It is also possible to delete any element of the project, to add any element of the project, and to modify any property of any element of the project.

According to an important aspect of the present invention, the modifications described above can be made while the project itself is being executed on the operating machine and/or plant.

The modifications made to the project occur, in fact, through changes made in the information model 26c, as indicated above, and can be implemented immediately by the various modules 23 of the management program 21. The modules 23 have the task of applying the modifications made to the project by means of variations to the information model 26c.

According to a further possible solution, the OPC UA server 28 allows modifications to the information model 26c only if the user connected to the OPC UA server has the appropriate authorizations. It is possible to classify different types of users based on said authorizations:
users who do not have the right to view and modify the information model 26c;
users who have the right to view the information model 26c but not to modify it;
users who have the right to view and modify the information model 26c.

According to a further possible solution, the authorizations to users can also be connected in relation to only one part of the information model 26c. This allows to make partial modifications to the project file 26.

Alternatively, according to a variant of the invention, said authorizations and the parts of the information model 26c can be combined together in any way.

By way of non-exhaustive example, in this case it is possible to have users with the following authorizations:
to view all the information model of the project 26c, but be able to modify only a part of it
to view a part of the information model 26c and not be able to modify it
to view a part of the information model 26c and be able to modify it.

According to a further possible solution, the modifications to the information model, implemented by the control unit 22, can be implemented temporarily, and therefore are valid only until the corresponding machine and/or plant is switched off.

According to a further possible solution, the modifications to the information model, implemented by the control unit 22, can be made persistent.

It is clear that modifications and/or additions of parts may be made to the management system and update method as described heretofore, without departing from the field and scope of the present invention.

It is also clear that, although the present invention has been described with reference to some specific examples, a person of skill in the art shall certainly be able to achieve many other equivalent forms, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A system, comprising:
a first computing device configured to execute a first computer program configured to:
receive a project file from a second computing device;
execute the project file;
display an information model representative of a series of nodes and one or more relationships between the series of nodes in response to receiving the project file, wherein the series of nodes and the one or more relationships are descriptive of the project file; and
receive an input via the information model, wherein the input is configured to modify the project file while the project file is being executed;
wherein the first computing device lacks second computer program for a development environment, wherein the second computer program is executable via the second computing device; and
wherein the first computer program comprises a runtime program that comprises a loader program and an open platform communication unified architecture (OPC UA) server program, wherein the loader program, when executed, is configured to:
read a respective definition of each node of the series of nodes and of each of the one or more relationships of the project file; and
upload the information model indicative of the respective definition of each node of the series of nodes and of each of the one or more relationships of the project file into the OPC UA server program; and
the second computing device configured to execute the second computer program for the development environment, wherein the development environment is configured to create the project file comprising a functional description of an operator interface application for an operator interface.

2. The system of claim 1, wherein the second computing device is configured to execute a first communication program to enable transfer of the project file from the second computing device to the first computing device via a communication channel.

3. The system of claim 1, wherein the OPC UA server program, when executed, is configured to display the information model of the project file prepared in the development environment.

4. The system of claim 1, wherein the information model is configured to be modified by an OPC UA client.

5. The system of claim 1, wherein the first computing device is incorporated in a machine operating in an industrial plant and is configured to execute the second computer program.

6. The system of claim 1, wherein the first computing device is configured to interact with or determine functions of a machine operating in an industrial plant.

7. The system of claim 1, wherein the project file is transferred from the computing device to the first computing device via one or more instruction packets defined by OPC UA standard.

8. The system of claim 1, wherein the first computing device and the second computing device are distinct and separate components configured to communicate with each other via a local network or a remote network.

9. The system of claim 1, wherein the first computing device and the second computing device are incorporated in a single component that includes one or more functionalities of the first computing device and the second computing device.

10. The system of claim 1, wherein the first computing device, upon executing the project file, is configured to extend the information model to one or more OPC UA nodes.

11. The system of claim 10, wherein the first computing device is configured to extend the information model to the one or more OPC UA nodes by generating one or more object types associated with a series of instance declarations, wherein the one or more object types are configured to be modified to add one or more characteristics to characterize the project file.

12. A method, comprising:
on a first computing device executing a runtime program for:
receiving, via a processor, a project file from a second computing device, wherein the project file is created in a development environment on the second computing device, and wherein the project file comprises a series of nodes and one or more relationships between the series of nodes that describe one or more functionalities of an operator interface application for an operator interface, and wherein the first computing device lacks the development environment;
reading, via the processor utilizing a loader program of the runtime program, a plurality of definitions of the series of nodes and of the one or more relationships between the series of nodes;
uploading, via the processor utilizing the loader program, an information model that describes the series of nodes and the one or more relationships between the series of nodes into an open platform communication unified architecture (OPC UA) server program, wherein each node of the information model is modifiable and extendable;
causing, via the processor, the display of the information model; and
receiving, at the processor, an input via the information model that modifies the project file while the project file is being executed.

13. The method of claim 12, comprising transferring information related to updating the project file, to the processor, via instructions packets defined by an OPC UA standard.

14. One or more non-transitory computer-readable media encoding one or more processor-executable routines, wherein the one or more routines, when executed by a processor, cause acts to be performed comprising:

on a first computing device executing a runtime program for:
- receiving a project file from a second computing device, wherein the project file is created in a development environment on the second computing device, and wherein the project file comprises a series of nodes and one or more relationships between the series of nodes that describe one or more functionalities of an operator interface application for an operator interface, and wherein the first computing device lacks the development environment;
- reading, via a loader program of the runtime program, a plurality of definitions of the series of nodes and of the one or more relationships between the series of nodes;
- uploading, via the loader program, an information model that describes the series of nodes and the one or more relationships between the series of nodes into an open platform communication unified architecture (OPC UA) server program, wherein each node of the information model is modifiable and extendable;
- causing the display of the information model; and
- receiving an input via the information model that modifies the project file while the project file is being executed.

15. The one or more non-transitory computer-readable media of claim 14, wherein the operator interface is associated with an additional computing device that is distinct and separate from the computing device, and the additional computing device and the computing device communicate with each other via a local network or a remote network.

* * * * *